Patented Jan. 24, 1933

1,895,351

UNITED STATES PATENT OFFICE

CYRIL J. STAUD AND JAMES T. FUESS, OF ROCHESTER, NEW YORK, ASSIGNORS TO EASTMAN KODAK COMPANY, OF ROCHESTER, NEW YORK, A CORPORATION OF NEW YORK

THE HYDROLYSIS OF CELLULOSE ESTERS USING NEUTRAL SALTS AS INHIBITORS

No Drawing. Application filed October 10, 1929. Serial No. 398,807.

This invention relates to a process for the treatment of cellulose esters and more particularly to the inhibiting of hydrolytic action during the hydrolysis step.

It is well known in the commercial manufacture of cellulose acetate, which is generally manufactured by a process of treating cellulose in a solution of acetic anhydride containing a catalyst such as sulfuric acid and a diluent as acetic acid, that the resulting product which is triacetyl cellulose will produce better products if the triacetyl be hydrolyzed below 44.8% acetyl, the percentage of acetyl combined in the triacetate of cellulose. The hydrolysis may be conducted, after acetylation, by destroying the acetic anhydride remaining in the acetylating bath and then adding thereto, dissolved in a suitable liquid, a mineral acid such as, for example, sulfuric acid. This treatment is preferably conducted at a temperature of between 75° and 130° F. The reaction takes place somewhat slowly and its completion is determined by removing samples of the cellulose acetate from the solution and determining their solubility. When the correct solubility has been attained the whole batch is precipitated to destroy further hydrolysis.

In plant practice it is often impossible to immediately precipitate the large batch of hydrolyzed material when it has reached the desired degree of hydrolysis because of the lack of storage or other reasons and it is frequently necessary, therefore, to hold the batch for some time after the conclusion of the hydrolysis before it can be precipitated. In order to prevent a further hydrolysis of the cellulose ester during this "holding" period various expedients have been resorted to. Generally the temperature of the whole is lowered as far as possible but there is a danger by such treatment of a "jelling" of the whole solution whereby subsequent treatment of the mass is very difficult and in some cases impossible. This cooling process which is conducted by surrounding the container with a cooled brine solution is, of course, expensive. Heretofore, however, this method of retarding the hydrolysis is the only one which has been extensively used.

An object of the present invention is to provide a process whereby the hydrolysis of the cellulose ester may be controlled. Another object is to inhibit the hydrolysis of the cellulose ester when the cellulose ester has been hydrolyzed to the desired degree. Other objects will hereinafter appear.

We have found that the hydrolysis of a cellulose ester may be retarded by the addition to the hydrolyzing bath, when the cellulose ester has been hydrolyzed to the desired degree, of neutral inorganic salts. By the presence of these salts in the bath the further saponification of the cellulose ester practically ceases and the resulting solution may be held at the temperature of the hydrolyzing reaction or allowed to cool if desired without any further marked saponification of the cellulose ester.

Our invention has the further advantageous effect of bleaching the cellulose acetate upon the addition to the hydrolyzing bath of the herein named nitrate salts, thus giving a final product of greater purity and appearance.

The neutral salts which we have found suitable for our purpose comprise the alkali metal salts of sulfuric and nitric acid particularly. The sodium and potassium salts have been used to considerable advantage and while they appear to give excellent results and retard the saponification reaction so that it proceeds only at an insignificant rate, other alkali metal salts of these and other strong mineral acids, while not as energetic in their inhibiting action, are suitable in many instances. For instance, salts such as sodium chloride have been used and it has been found that they are about 25% as efficient for this purpose as sodium and potassium nitrates.

We have found that it is advantageous to add the salts to the hydrolyzing bath in solution in a compatible liquid which is both a solvent for the salt and does not react with the ingredients in the hydrolyzing bath. Acetic acid as a solvent of the neutral salts has proven advantageous but other liquid organic acids or solvents may likewise be employed.

Upon the addition of these ingredients, it is desirable that they be as rapidly as possible dispersed throughout the reacting mixture in order that the saponification may be uniformly and quickly retarded. The hydrolysis, therefore, is preferably conducted in a container having suitable agitating or stirring means whereby this dispersion may be carried out.

We have found that the addition to the hydrolyzing bath of from 5% to 20% of the neutral salt, compared to the weight of the cellulose acetate, dissolved in above five times its weight of glacial acetic acid is sufficient in most instances. If the time for the precipitation of the hydrolyzing bath is known it is possible under accurate control methods to add to the bath just sufficient of the inhibiting neutral salt to render the ester esterified to the proper value at that time.

We shall now give several methods of carrying out our invention but it will be understood that we are not to be limited by the proportions or particular ingredients therein given except as they are indicated in the appended claims.

To cellulose triacetate solution prepared in accordance with U. S. patent of C. J. Malm, 1,645,915, there was added the following hydrolyzing solution. 2.3 parts of sodium bisulfatemonohydrate dissolved in 26 parts of water and 40 parts of glacial acetic acid. The acetyl content of the triacetate was found to be 44.3%. After 42 hours saponification at 53° C. a sample was removed and found to contain 40.5% acetyl. There was then added to the solution of cellulose another solution consisting of 10 parts by weight of sodium nitrate dissolved in 50 parts by weight of glacial acetic acid. The resulting solution was held for 48 hours longer at 53° C. and then precipitated in water, washed and dried. The resulting product contained 39.4% acetyl. A parallel solution in which no sodium nitrate was added and at which the initial cellulose acetate had the same acetyl value gave a product having 35.8% acetyl.

To a solution of cellulose triacetate prepared from 50 grams of cotton linters in accordance with the procedure described in the above example there was added to the acetylating reaction mixture 10 parts by weight of sodium nitrate, 2.3 parts by weight of sodium bisulfatemonohydrate, 26 parts by weight of water and 40 parts by weight of glacial acetic acid. The acetyl content of the starting material was 44.1%. After 43 hours at a temperature of 53° C. the acetyl value had decreased to but 43.1%. A parallel saponification without the addition of sodium nitrate gave a product containing 38.7% acetyl.

While the above examples describe the use particularly of sodium nitrate dissolved in acetic acid, nevertheless the equivalents of this neutral salt may be used in any suitable solvent for retarding the hydrolysis and bleaching the cellulose acetate without in any way departing from this invention or sacrificing any of the advantages derived therefrom.

What we claim as our invention and desire to be secured by Letters Patent of the United States is:

1. In the process of making celluose acetate, the step which comprises adding a neutral salt of an alkali metal to the hydrolyzing bath when the cellulose acetate has reached approximately the desired acetyl content, to inhibit further hydrolysis of the cellulose acetate.

2. In the process of making cellulose acetate, the step which comprises adding a neutral salt of an alkali metal dissolved in an acetic acid solution to the hydrolyzing bath when the cellulose acetate has reached approximately the desired acetyl value to inhibit further hydrolytic action of said bath.

3. In the process of the manufacture of cellulose acetate, the step which comprises adding from 5% to 20% of sodium nitrate to a hydrolyzing bath to inhibit the hydrolytic action of the bath.

4. In the process of the manufacture of cellulose acetate, the step which comprises adding 5% to 20% of sodium nitrate dissolved in acetic acid to the hydrolyzing bath when the cellulose acetate has reached approximately the desired acetyl value to inhibit further hydrolytic action thereof.

5. In the process of making cellulose esters, the step which comprises adding an alkali-metal nitrate to the hydrolyzing bath to inhibit the hydrolytic action thereof.

6. In the process of preparing a cellulose ester, the step which comprises adding 5% to 20% of an alkali-metal nitrate to the hydrolyzing bath to inhibit the hydrolytic action of the bath.

7. In the process of preparing cellulose acetate, the step which comprises adding 5% to 20% of an alkali-metal nitrate to the hydrolyzing bath to inhibit the hydrolytic action of the bath.

Signed at Rochester, New York, this 5th day of October, 1929.

CYRIL J. STAUD.
JAMES T. FUESS.

CERTIFICATE OF CORRECTION.

Patent No. 1,895,351.  January 24, 1933.

CYRIL J. STAUD, ET AL.

It is hereby certified that error appears in the printed specification of the above numbered patent requiring correction as follows: Page 2, line 12, for "above" read "about"; and that the said Letters Patent should be read with this correction therein that the same may conform to the record of the case in the Patent Office.

Signed and sealed this 9th day of May, A. D. 1933.

M. J. Moore.

Acting Commissioner of Patents.

(Seal)